United States Patent
Shimanaka (10) Patent No.: US 11,365,771 B2
(45) Date of Patent: Jun. 21, 2022

(54) ONE-WAY CLUTCH

(71) Applicant: TSUBAKIMOTO CHAIN CO., Osaka (JP)

(72) Inventor: Yoshihito Shimanaka, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 17/008,878

(22) Filed: Sep. 1, 2020

(65) Prior Publication Data

US 2020/0400203 A1 Dec. 24, 2020

Related U.S. Application Data

(63) Continuation of application No. PCT/JP2018/047532, filed on Dec. 25, 2018.

(30) Foreign Application Priority Data

Mar. 12, 2018 (JP) .............................. JP2018-043829
Jul. 2, 2018 (JP) .............................. JP2018-126114

(51) Int. Cl.
*F16D 41/07* (2006.01)
*F16D 41/063* (2006.01)
*F16H 57/04* (2010.01)
*F16D 43/18* (2006.01)

(52) U.S. Cl.
CPC .......... *F16D 41/07* (2013.01); *F16D 41/063* (2013.01); *F16D 43/18* (2013.01); *F16H 57/0473* (2013.01); *F16D 2300/06* (2013.01)

(58) Field of Classification Search
CPC .... F16D 41/07; F16D 43/14; F16D 2043/145; F16D 43/18; F16D 2300/06

(Continued)

(56) References Cited

U.S. PATENT DOCUMENTS 3,175,661 A * 3/1965 Maurer .................. F16D 41/07
192/45.1
3,997,041 A * 12/1976 Judd ....................... F16D 41/07
192/41 A
(Continued)

FOREIGN PATENT DOCUMENTS

DE 102009031190 A1 1/2010
EP 1900958 A1 3/2008
(Continued)

OTHER PUBLICATIONS

International Search Report dated Mar. 26, 2019, issued in counterpart International Application No. PCT/JP2018/047532 (2 pages).
(Continued)

*Primary Examiner* — Richard M Lorence
(74) *Attorney, Agent, or Firm* — WHDA, LLP (57) ABSTRACT

An object of the present invention is to provide a one-way clutch capable of preventing wear on radially inner engagement surfaces and radially outer engagement surfaces of cams in periods of high-speed freewheeling. The one-way clutch includes an inner race (110) and an outer race (150), a plurality of cams (140) provided between the inner race (110) and the outer race (150), and side plates (120, 130) provided to at least one of the inner race (110) and outer race (150) and positioned on both sides in an axial direction of the cams (140). The plurality of cams (140) are each configured to receive a predetermined centrifugal force to turn in an engaging direction in which the cams engage the inner race (110) and outer race (150) when the inner race (110) and outer race (150) rotate together in the same direction.

5 Claims, 6 Drawing Sheets (58) Field of Classification Search
USPC ...... 192/41 A, 45.002, 45.1, 105 R, 105 CD, 192/103 B, 113.32
See application file for complete search history.

(56) References Cited

U.S. PATENT DOCUMENTS

| | | | |
|---|---|---|---|
| 5,320,204 | A | 6/1994 | Riggle et al. |
| 5,664,653 | A | 9/1997 | Kurita et al. |
| 6,220,414 | B1 | 4/2001 | Nagaya et al. |
| 2005/0067248 | A1 | 3/2005 | Takasu |

FOREIGN PATENT DOCUMENTS

| | | |
|---|---|---|
| JP | 62-46838 U | 3/1987 |
| JP | 62-52226 A | 3/1987 |
| JP | 63-285336 A | 11/1988 |
| JP | 5-67824 U | 9/1993 |
| JP | 5-89976 U | 12/1993 |
| JP | H06257627 A | 9/1994 |
| JP | 9-96325 A | 4/1997 |
| JP | 2000-130470 A | 5/2000 |
| JP | 2000-161471 A | 6/2000 |
| JP | 2000-310314 A | 11/2000 |
| JP | 2001-295867 A | 10/2001 |
| JP | 2005-106135 A | 4/2005 |
| JP | 2007-92870 A | 4/2007 |

OTHER PUBLICATIONS

Extended European Search Report dated Jun. 8, 2021, issued in counterpart EP Application No. 18909849.4 (7 pages).

* cited by examiner

ONE-WAY CLUTCH

TECHNICAL FIELD

The present invention relates to a one-way clutch having a plurality of cams between an inner race and an outer race and configured such that radially inner engagement surfaces and radially outer engagement surfaces of the cams frictionally engage an outer circumferential engagement surface of the inner race and an inner circumferential engagement surface of the outer race, respectively, when the inner race is rotated in one direction or when the outer race is rotated in the other direction, and such that the inner race or the outer race freewheels when the inner race is rotated in the other direction or when the outer race is rotated in one direction.

BACKGROUND ART

Existing one-way clutches used in applications where the inner race and outer race freewheel at high speed use a retainer that retains cams. The cams are retained by the retainer fixed to either the inner race or the outer race that freewheels at high speed to cause the cams to rotate in the same direction as the inner race or outer race so that a centrifugal force is applied to the cams to turn (lift off) the cams. This is to bring both the radially inner engagement surfaces and radially outer engagement surfaces of the cams out of contact with the outer circumferential surface of the inner race and/or the inner circumferential surface of the outer race so as to prevent wear on the radially inner and outer engagement surfaces of the cams.

Meanwhile, there have also been proposed other types of one-way clutches that transmit torque from the inner race or outer race to the cams when the inner race and outer race freewheel by way of a configuration other than the one that uses a retainer fixed to the inner race or outer race to transmit torque from the inner race or outer race to the cams. The following are examples of the one-way clutch described above.

CITATION LIST

Patent Literature

[Patent Literature 1] Japanese Patent Application Publication No. 2005-106135
[Patent Literature 2] Japanese Patent Application Publication No. 2007-092870

Patent Literature 1 discloses a one-way clutch that uses a wire cage connected to a pair of side plates, which are fixed to the outer race, for retaining the plurality of cams set between the inner race and the outer race in a circumferentially equally spaced manner. This way, torque can be transmitted from the outer race to the cams via the retainer fixed to the outer race.

Patent Literature 2 discloses a one-way clutch that uses an inner retainer and an outer retainer for retaining the plurality of cams set between the inner race and the outer race in a circumferentially equally spaced manner. The outer retainer is fixed to the outer race. The cams have a blade-like portion. According to this configuration, the blade-like portions of the cams receive a fluid such as lubricant or air when the outer race rotates to cause the cams to turn.

However, the one-way clutch having a retainer has following issues. Namely, issues such as an increase in the size of the one-way clutch because of the retainer, breakage of the retainer caused by collision between the retainer and the cams resulting from vibration or the like applied to the one-way clutch, and the difficulty and the cost of producing a retainer having a complex structure.

Another type of one-way clutch used for applications in which the inner race and outer race freewheel at low speed is not provided with a retainer. The cams in this case are restricted from moving axially and retained between the inner race and the outer race by side plates positioned on both sides in the axial direction of the cams. The side plates are not fixed to the inner race or the outer race. Therefore, when the inner race and outer race freewheel, the radially inner engagement surfaces and radially outer engagement surfaces of the cams slide on the outer circumferential engagement surface of the inner race and the inner circumferential engagement surface of the outer race. The one-way clutch with this configuration is affected to a limited extent by the wear on the radially inner engagement surfaces and radially outer engagement surfaces of the cams in cases where the inner race and outer race freewheel at low speed. However, this configuration is not suited to one-way clutches used in applications where the inner race and outer race freewheel at high speed, since the influence of wear on the radially inner engagement surfaces and radially outer engagement surfaces of the cams increases in cases where the inner race and outer race freewheel at high speed.

Another issue with some one-way clutches is biasing means provided to bias the plurality of cams either radially inward or outward, which also makes it difficult to reduce the axial size of the one-way clutch. Further problem is the large work burden due to the large number of components to be handled during the assembly of the clutch.

SUMMARY OF INVENTION

Technical Problem

Accordingly, in view of the issues in the existing techniques described above, an object of the present invention is to provide a one-way clutch that is simple and easy to manufacture, made smaller in an axial direction, lightweight and unbreakable, and capable of preventing wear on radially inner engagement surfaces and radially outer engagement surfaces of cams in periods of high-speed freewheeling.

Solution to Problem

The present invention solved the above issues by providing a one-way clutch including an inner race and an outer race rotatable relative to each other around an identical axis; and a plurality of cams provided in a circumferential direction between the inner race and the outer race, the plurality of cams each frictionally engaging the inner race and the outer race when the inner race is rotated in one direction or when the outer race is rotated in the other direction, and the plurality of cams each disengaging from the inner race and the outer race when the inner race is rotated in the other direction or when the outer race is rotated in one direction, wherein at least one of the inner race and the outer race includes side plates that rotate with the inner race or the outer race and positioned on both sides in an axial direction of the cams, and the plurality of cams are each configured to receive a predetermined centrifugal force to turn in an engaging direction in which the cams engage the inner race and outer race when the inner race and outer race rotate together in a same direction.

Advantageous Effects of Invention

According to the invention set forth in claim 1, the plurality of cams provided between the outer race and the inner race are retained by side plates sandwiching them in the axial direction. The retainer is thus dispensed with in the present invention. The clutch is therefore unbreakable, simple-structured and easy to manufacture, as well as small and lightweight, since failures resulting from breakage of the retainer do not occur.

The plurality of cams are each configured to turn in an engaging (meshing) direction when they receive a centrifugal force. That is, the torque that is usually applied to the cams by biasing means such as springs is given by the centrifugal force that acts on the center of gravity of the cams when the cams rotate in the same direction as the outer race and inner race. The cam behaviors can be stabilized and power transmission performance can be achieved as designed according to the present invention even though there are no biasing means. The one-way clutch is thus made even smaller in the axial direction (thinner).

Furthermore, the reduction in the number of components lessens the burden of assembling work, which makes manufacturing of the one-way clutch easy.

According to the configuration set forth in claim 2, the side plates are annular plates that cover a radially inner portion or a radially outer portion of each of the plurality of cams, and spaces between inner surfaces of the side plates and respective end faces of the plurality of cams are filled with lubricant. The plurality of cams are each configured to separate from an outer circumferential engagement surface of the inner race by viscosity of the lubricant when either the inner race or the outer race rotates in a direction in which the cams disengage. Thus the radially inner engagement surfaces of the cams are brought out of contact with the outer circumferential engagement surface of the inner race when the one-way clutch freewheels, so that wear on the radially inner engagement surfaces and radially outer engagement surfaces of the cams can be prevented in periods of high-speed freewheeling of the inner race or outer race.

According to the configuration set forth in claim 3, the plurality of cams are aligned in contact with each other so that closed space is formed by circumferential surfaces of adjacent cams, an outer circumferential surface of the inner race, and inner surfaces of the radially inner side plates. As the lubricant is continually supplied into the closed space via an oil passage formed in the inner race during freewheeling of the one-way clutch, pressure is applied in a direction in which the volume of the closed space is increased, so that the respective radially inner engagement surfaces of the plurality of cams can be brought out of contact with the outer circumferential engagement surface of the inner race when the one-way clutch freewheels. Therefore, wear on the radially inner engagement surfaces and radially outer engagement surfaces of the cams can reliably be prevented in periods of high-speed freewheeling.

The plurality of cams being aligned circumferentially with little looseness can also realize a high transmittable torque capacity.

According to the configuration set forth in claim 4, the state in which the radially inner engagement surfaces of the cams are not in contact with the outer circumferential engagement surface of the inner race can be reliably achieved by the action of the lubricant filling the spaces between the respective inner surfaces of the radially inner side plates and radially outer side plates and the respective end faces of the plurality of cams, in addition to the action of the pressure applied by the continuous supply of the lubricant during the freewheeling of the one-way clutch. Therefore, wear on the radially inner engagement surfaces and radially outer engagement surfaces of the cams can reliably be prevented in periods of high-speed freewheeling.

According to the configuration set forth in claim 5, the retainer retains each of the plurality of cams in a circumferentially equally spaced manner. Therefore, each cam can turn without being restricted by adjacent cams, which allows speedy engagement or disengagement between all of the cams and the inner race and outer race, when the inner race or outer race is rotated.

DESCRIPTION OF EMBODIMENTS

One embodiment of the present invention will be described with reference to FIG. 1 to FIG. 9. Note, however, the present invention is not limited to this embodiment.

Figure 1:
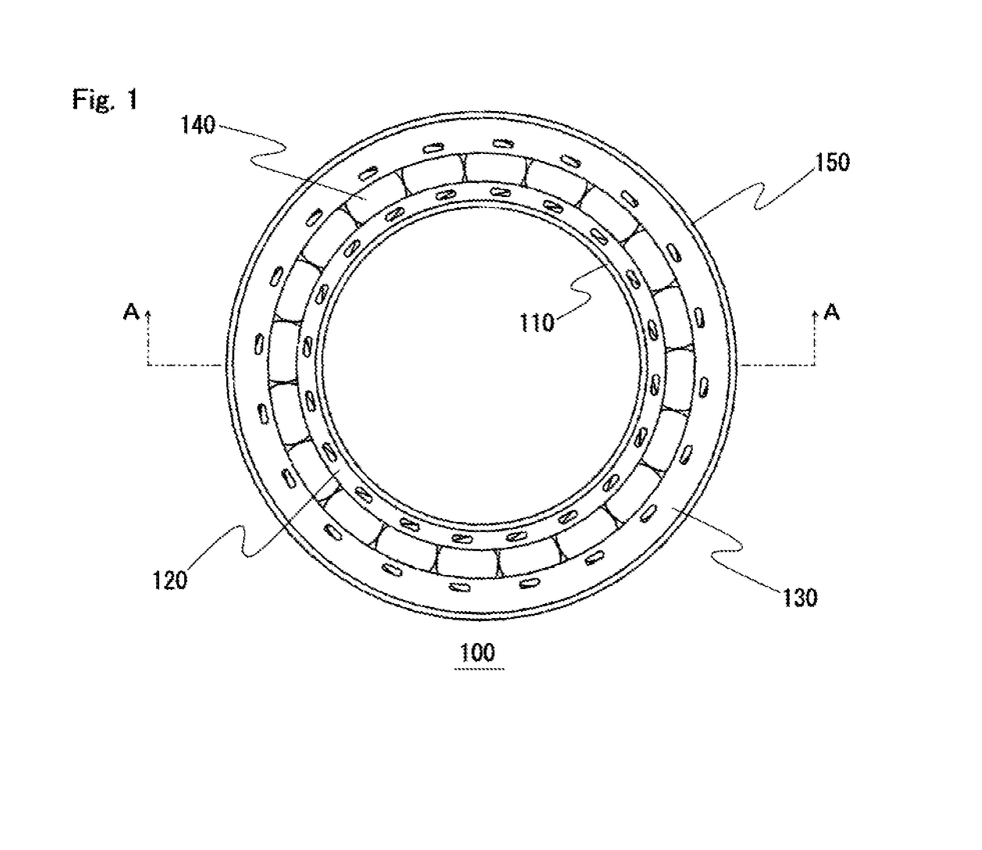
FIG. 1 is a plan view illustrating one configuration example of a one-way clutch of the present invention.
Figure 2:
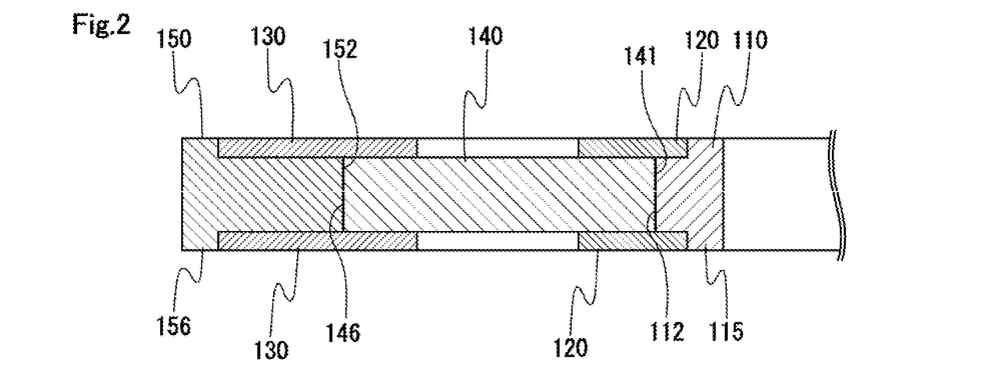
FIG. 2 is an enlarged cross-sectional view illustrating a part of a cross section along line A-A of FIG. 1.
Figure 3:
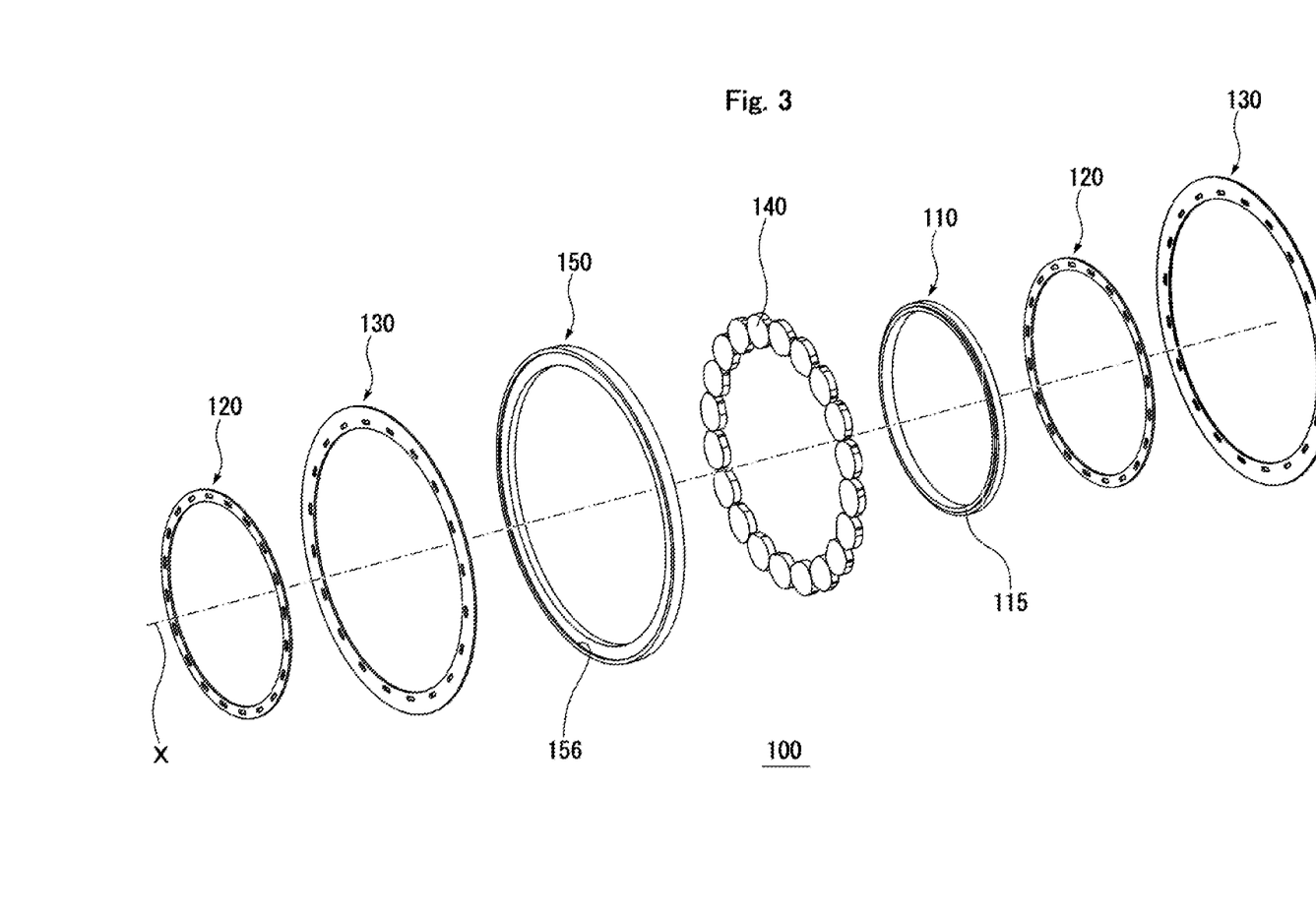
FIG. 3 is an exploded perspective view of the one-way clutch illustrated in FIG. 1.

FIG. 1 is a plan view illustrating one configuration example of a one-way clutch of the present invention. FIG. 2 is an enlarged cross-sectional view illustrating a part of a cross section along line A-A of FIG. 1. FIG. 3 is an exploded perspective view of the one-way clutch illustrated in FIG. 1.

This one-way clutch 100 includes an inner race 110 and an outer race 150 that are rotatable relative to each other around the same axis X, and a plurality of cams 140 provided between the inner race 110 and the outer race 150.

Each of the cams 140 has a radially inner engagement surface 141 and a radially outer engagement surface 146, and both end faces of each cam are flat surfaces.

The radially inner engagement surface 141 of the cam 140 is configured to frictionally engage an outer circumferential engagement surface 112 of the inner race 110 when the inner race 110 is rotated in one direction or when the outer race 150 is rotated in the other direction, and to disengage from the outer circumferential engagement surface 112 of the inner race 110 when the inner race 110 is rotated in the other direction or when the outer race 150 is rotated in one direction.

The radially outer engagement surface 146 of the cam 140 is configured to frictionally engage an inner circumferential engagement surface 152 of the outer race 150 when the inner race 110 is rotated in one direction or when the outer race 150 is rotated in the other direction, and to disengage from the inner circumferential engagement surface 152 of the outer race 150 when the inner race 110 is rotated in the other direction or when the outer race 150 is rotated in one direction.

The shape of the cam 140 may be changed as required.

Figure 4:
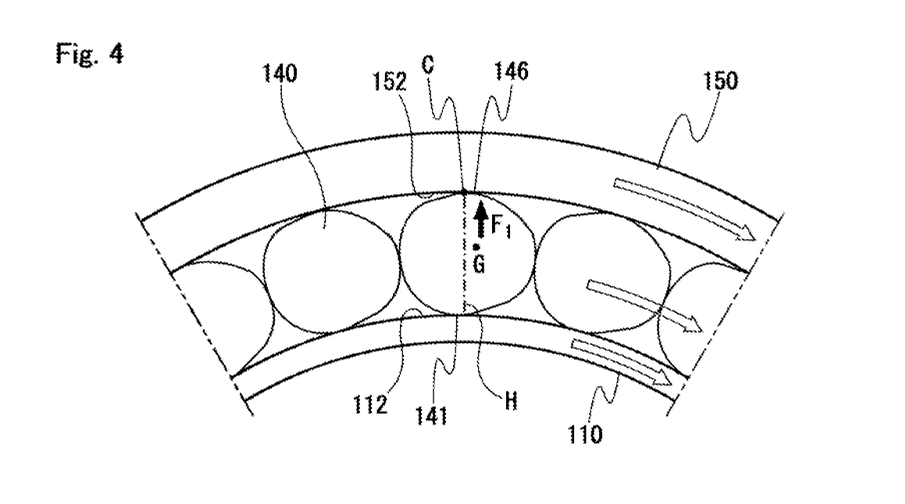
FIG. 4 is a conceptual diagram for describing the operation of the one-way clutch illustrated in FIG. 1.

All the cams 140 are positioned, as illustrated in FIG. 4, to have their centers of gravity G displaced from the normal line H at the point of tangency C between the radially outer engagement surface 146 and the inner circumferential engagement surface 152 of the outer race 150 so that, when the inner race 110 and outer race 150 rotate together in the same direction, a predetermined centrifugal force causes the cam to turn in the direction in which the cam engages the inner race 110 and the outer race 150.

For example, let us assume that the inner race 110 is rotating in one direction (clockwise, white arrows in FIG. 4 indicating the direction of rotation), and the outer race 150 is rotating in the same direction as the inner race 110 at a higher rotation speed, i.e., the clutch is overrunning (freewheeling). At this time, in this one-way clutch 100, the cams 140 are rotating (revolving) in the same direction as the inner race 110 and outer race 150 so that torque is generated by the centrifugal force F1 acting on the center of gravity G of the cam 140 to cause the cam 140 to turn in the engaging direction. When the rotation speed of the inner race HO increases, or the rotation speed of the outer race 150 decreases, and the moment when the rotation speed of the inner race 110 becomes equal to the rotation speed of the outer race 150, the clutch locks (engages) because of the torque applied on the cams 140 in the engaging direction. This one-way clutch 100 can apply a force corresponding to the biasing force given by springs or the like as used in existing one-way clutches to the cams 140 in this way when the clutch engages.

The cams 140 should preferably be disposed along the circumferential direction with little looseness.

Figure 5:
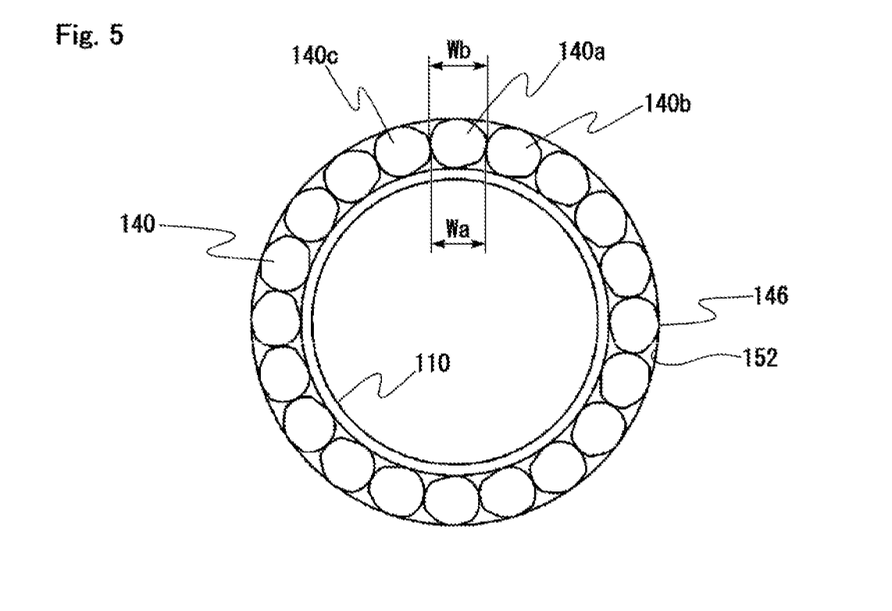
FIG. 5 is a diagram for describing how cams are aligned.

In this example, as illustrated in FIG. 5, with the radially outer engagement surfaces 146 of the plurality of cams 140 each contacting the inner circumferential engagement surface 152 of the outer race (not shown), and with all the cams 140 except for the first cam 140a being in tight contact with each other, the first cam 140a should be able to touch both adjacent cams 140b and 140c when moved radially inward. Namely, in a preferable configuration, the distance Wa between the cams 140b and 140c both adjacent the first cam 140a and positioned closest to each other is smaller than the width Wb of the first cam 140a, with all the cams 140 except for the first cam 140a being in tight contact with each other. With such a configuration, when the outer race 150, all the cams 140 except for the first cam 140a, and radially outer side plates 130 to be described later are assembled together, the first cam 140a does not come off toward the inner race side, even though the inner race 110 is not assembled yet. Thus assembling is made easier so that the one-way clutch can be assembled easily. This configuration can also realize a high transmittable torque capacity.

In the one-way clutch 100 of this embodiment, the inner race 110 includes radially inner side plates 120 that rotate with the inner race 110 and positioned on both sides in the axial direction of the cams 140, and the outer race 150 includes radially outer side plates 130 that rotate with the outer race 150 and positioned on both sides in the axial direction of the cams 140. It suffices if at least one of the inner race 110 and the outer race 150 has the side plates.

The radially inner side plates 120 are annular plates that cover a radially inner portion on respective end faces of the plurality of cams 140, and are fixedly fitted to cylindrical shaft parts 115 protruding axially outward from respective inner peripheral edges on both end faces of the inner race 110 to rotate integrally with the inner race 110.

The radially outer side plates 130 are annular plates that cover a radially outer portion on respective end faces of the plurality of cams 140, and are fixedly fitted with inner circumferential surfaces of circumferential wall portions 156 protruding axially outward and extending along the respective outer peripheral edges on both end faces of the outer race 150 to rotate integrally with the outer race 150.

The outer circumferential surface of the radially inner side plate 120 and the inner circumferential surface of the radially outer side plate 130 is spaced apart so that the end faces of the cams 140 are partly exposed.

The radially inner side plates 120 and radially outer side plates 130 may be retained with retention rings (not shown) so that they are fixed to and rotate integrally with the inner race 110 and outer race 150. Alternatively, the radially inner side plates 120 and radially outer side plates 130 may be fixedly fastened to the inner race 110 and outer race 150 with bolts or the like.

In a preferable configuration of the one-way clutch 100 of this embodiment, the space between the end faces of the cams 140 and the inner surfaces of the radially inner side plates 120, and the space between the end faces of the cams 140 and the inner surfaces of the radially outer side plates 130 may be filled with a lubricant (not shown).

Figure 6A:
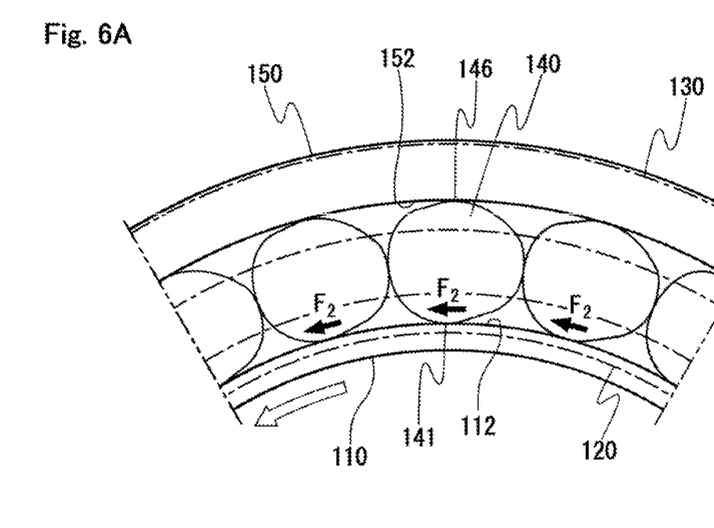
FIG. 6A is a conceptual diagram showing a state in which a force for turning the cams in the disengaging direction is applied by the viscosity of the lubricant when the inner race is rotated in the counterclockwise direction in another example of the one-way clutch of the present invention.
Figure 6B:
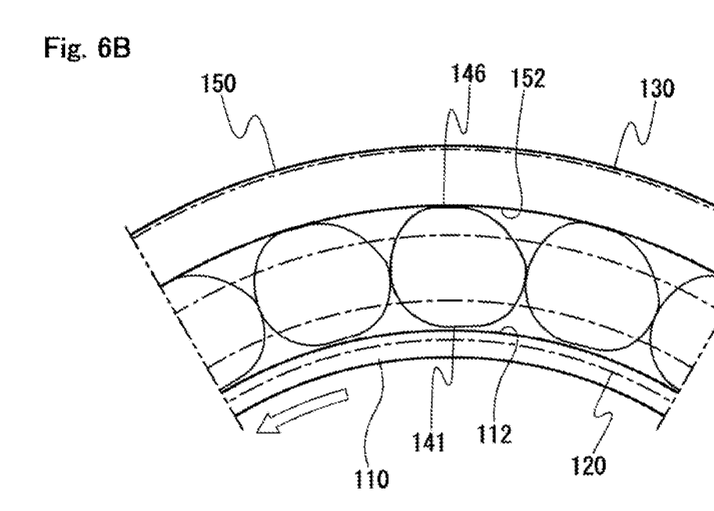
FIG. 6B is a conceptual diagram showing a state in which the cams are separated from the inner race in another example of the one-way clutch of the present invention.

When the inner race 110 rotates in the other direction (counterclockwise), for example, the radially inner side plates 120 secured to the inner race 110 rotate in the same direction as the inner race 110 as illustrated in FIG. 6(a). The lubricant between the inner surfaces of the radially inner side plates 120 and the end faces of the cams 140 then tries to rotate in the same direction due to its viscosity, so that forces F2 that cause the cams 140 to turn in the disengaging direction act on regions on both end faces of the cams 140 facing the radially inner side plates 120. In this way, this one-way clutch 100 can cause the cams 140 to separate (lift off) from the inner race 110 by the viscosity of the lubricant that causes the cams 140 to turn in the disengaging direction when the inner race 110 is rotated in the other direction as illustrated in FIG. 6(b). The lubricant should have a viscosity high enough to be able to cause the cams 140 to rotate in the same direction as the inner race 110.

Although not to be described with reference to a drawing, the clutch may be configured such that when the outer race is rotated in the other direction (counterclockwise), the respective radially inner engagement surfaces of the plurality of cams are separated from the outer circumferential engagement surface of the inner race to achieve a state in which the cams do not touch the outer circumferential engagement surface of the inner race.

Preferably, the one-way clutch of the present invention includes a structure to allow for supply of the lubricant.

Figure 7A:
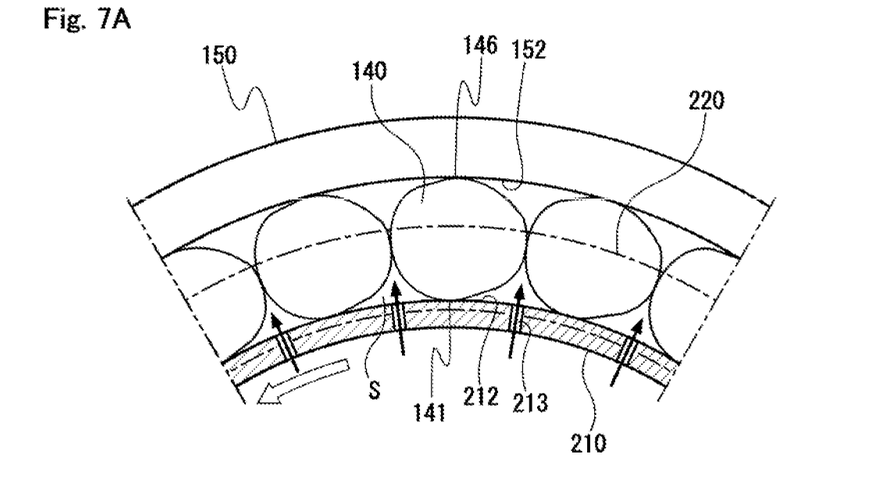
FIG. 7A is a cross-sectional view schematically illustrating a configuration of yet another example of a one-way clutch of the present invention.

In this one-way clutch, as illustrated in FIG. 7(a), the plurality of cams 140 are aligned in contact with each other in a state in which a closed space S is formed by the circumferential surfaces of two adjacent cams 140, the outer circumferential surface of the inner race 210, and the inner surfaces of the radially inner side plates 220, and the inner race 210 includes oil passages 213 for continually supplying the lubricant to the closed spaces.

The oil passages 213 are radially extending through holes formed at positions corresponding to the closed spaces at respective points between the cams in the side face of the inner race 210.

Figure 7B:
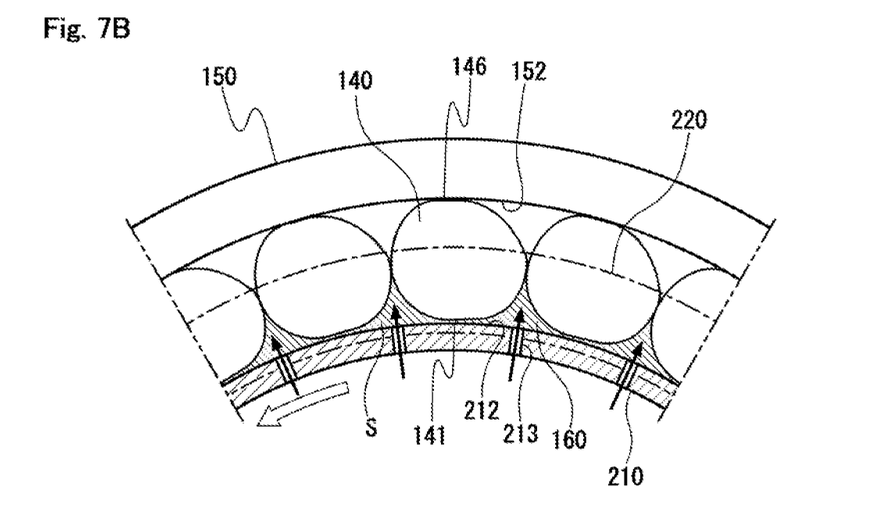
FIG. 7B is a conceptual diagram showing a state in which the cams are separated from the inner race in yet another example of the one-way clutch of the present invention.

In the one-way clutch of this embodiment, when the inner race 210 is rotated in the other direction (counterclockwise), for example, the cams 140 turn in the direction in which they disengage from the outer circumferential engagement surface 212 of the inner race 210 and the inner circumferential engagement surface 152 of the outer race 150, as illustrated in FIG. 7(b). Then, as the lubricant 160 flowing through the inner space of the inner race 210 is continually supplied into the closed spaces S via the oil passages 213, pressure is applied in a direction in which the volume of the closed space S is increased, so that the respective radially inner engagement surfaces 141 of the plurality of cams 140 can be separated from the outer circumferential engagement surface 212 of the inner race 210 to achieve a state in which the cams are not in contact with the outer circumferential engagement surface 212 of the inner race 210.

In an optional configuration of the one-way clutch of this embodiment, the spaces between the inner surfaces of the radially inner side plates and the cam end faces may be filled with lubricant. With such a configuration, the state in which the radially inner engagement surfaces of the cams are not in contact with the outer circumferential engagement surface of the inner race can be reliably achieved by the viscous action of the lubricant filling the spaces between the inner surfaces of the radially inner side plates and the end faces of the cams, in addition to the action of the pressure applied by the continuous supply of the lubricant into the closed spaces during the freewheeling of the one-way clutch.

An optional configuration of the one-way clutch of the present invention may include a retainer that retains each of the plurality of cams to either the inner race or the outer race.

Figure 8:
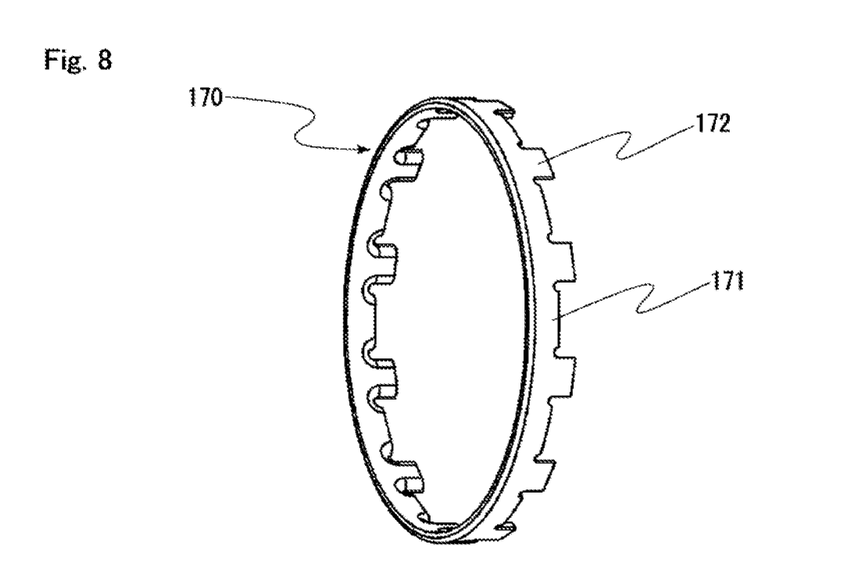
FIG. 8 is a perspective view illustrating one configuration example of a retainer.

The retainer is configured to retain each of the plurality of cams at equal distance in the circumferential direction. One configuration example of the retainer is illustrated in FIG. 8.

Figure 9:
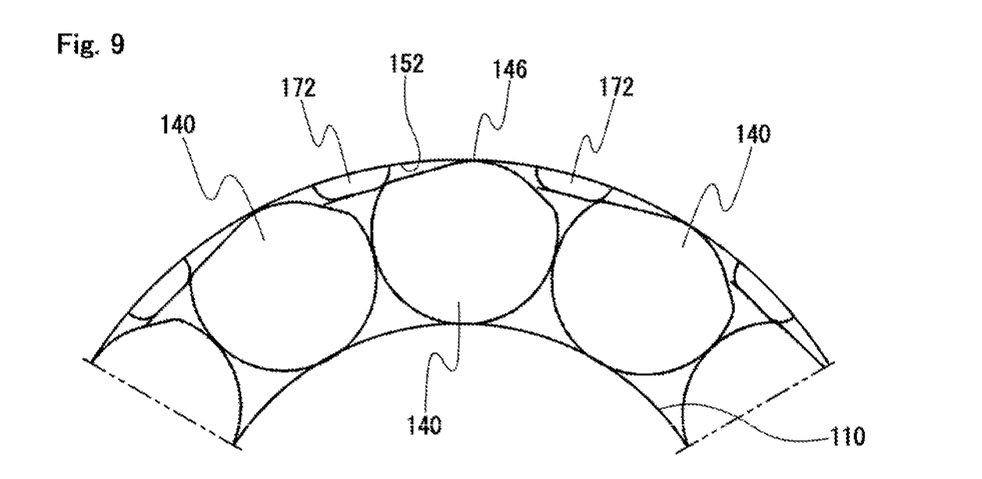
FIG. 9 is a diagram illustrating the positional relationship between the retainer and cams.

This retainer 170 includes a cylindrical base part 171 that fits with the inner circumferential surface of the outer race, and a plurality of axially outwardly protruding lug-like spacer parts 172 circumferentially equally spaced on one end face of the base part 171. This retainer 170 restricts the circumferential position of the cams, as illustrated in FIG. 9, with outer peripheral edge portions of the cams 140 being received in the spaces formed between adjacent spacer parts 172.

The retainer can have an annular plate-like base part, with a plurality of axially outwardly protruding lug-like spacer parts circumferentially equally spaced along the outer peripheral edge on one end face of the base part. With such a retainer, the annular plate-like base part can serve as an outer plate.

While one embodiment of the present invention has been described in detail, the present invention is not limited to the above-described embodiment and may be carried out with various design changes without departing from the scope of the present invention set forth in the claims.

For example, the radially inner side plates and radially outer side plates do not necessarily have to be provided separately for the inner race and outer race, and may be integrally formed with the inner race and outer race, or formed as part of the inner race and outer race.

The one-way clutch of the present invention may be of the type supplied with lubricant, and may also be of the type having sealing members to provide a seal between the outer race and the inner race and filled with grease.

As described above, the present invention can provide a one-way clutch that is simple and easy to manufacture, made smaller in the axial direction, lightweight and unbreakable, and capable of preventing wear in periods of high-speed freewheeling.

REFERENCE SIGNS LIST

100 One-way clutch
110, 210 Inner race
112, 212 Outer circumferential engagement surface
213 Oil passage
115 Shaft part
120, 220 Radially inner side plate
130 Radially outer side plate
140, 140b, 140c Cam
140a First cam
141 Radially inner engagement surface
146 Radially outer engagement surface
150 Outer race
152 Inner circumferential engagement surface
156 Circumferential wall portion
160 Lubricant
170 Retainer
171 Base part
172 Spacer part
C Point of tangency between cam and outer race
H Normal line at point of tangency
G Center of gravity of cam

The invention claimed is:

1. A one-way clutch comprising: an inner race and an outer race rotatable relative to each other around an identical axis; and a plurality of cams provided in a circumferential direction between the inner race and the outer race, the plurality of cams each frictionally engaging the inner race and the outer race when the inner race is rotated in one direction or when the outer race is rotated in the other direction, and the plurality of cams each disengaging from the inner race and the outer race when the inner race is rotated in the other direction or when the outer race is rotated in one direction, wherein at least one of the inner race and the outer race includes side plates that rotate with the inner race or the outer race and positioned on both sides in an axial direction of the cams, the plurality of cams are each configured to receive a predetermined centrifugal force to turn in an engaging direction in which the cams engage the inner race and outer race when the inner race and outer race rotate together in a same direction, and the side plates are annular plates that cover at most a radially inner portion or a radially outer portion of end faces of each of the plurality of cams, spaces between the respective end faces of the plurality of cams and inner surfaces of the side plates being filled with lubricant, and the plurality of cams each being configured to turn to cause a radially inner engagement surface of each cam to separate from an outer circumferential engagement surface of the inner race by a force acting on both end faces of the plurality of cams by viscosity of the lubricant when either the inner race or the outer race having the side plates rotates in a direction in which the cams disengage.

2. The one-way clutch according to claim 1, wherein the inner race includes annular plate-like radially inner side plates that cover a radially inner portion of end faces of each of the plurality of cams,
   the plurality of cams being aligned in contact with each other so that closed space is formed by circumferential surfaces of adjacent cams, an outer circumferential surface of the inner race, and inner surfaces of the radially inner side plates,
   the inner race including an oil passage that continually supplies lubricant to the closed space when the clutch freewheels.

3. The one-way clutch according to claim 2, wherein the outer race includes annular plate-like radially outer side plates that cover a radially outer portion of end faces of each of the plurality of cams,
   the plurality of cams each being configured to turn to cause a radially inner engagement surface of each cam to separate from an outer circumferential engagement surface of the inner race by viscosity of the lubricant when either the inner race or the outer race rotates in a direction in which the cams disengage.

4. The one-way clutch according to claim 1, further comprising a retainer that retains each of the plurality of cams to the inner race or the outer race, the retainer being configured to retain each of the plurality of cams in a circumferentially equally spaced manner.

5. A one-way clutch comprising: an inner race and an outer race rotatable relative to each other around an identical axis; and a plurality of cams provided in a circumferential direction between the inner race and the outer race, the plurality of cams each frictionally engaging the inner race and the outer race when the inner race is rotated in one direction or when the outer race is rotated in the other direction, and the plurality of cams each disengaging from the inner race and the outer race when the inner race is rotated in the other direction or when the outer race is rotated in one direction, wherein
   at least one of the inner race and the outer race includes side plates that rotate with the inner race or the outer race and positioned on both sides in an axial direction of the cams,
   the plurality of cams are each configured to receive a predetermined centrifugal force to turn in an engaging direction in which the cams engage the inner race and outer race when the inner race and outer race rotate together in a same direction,
   the inner race includes annular plate-like radially inner side plates that cover a radially inner portion of end faces of each of the plurality of cams,
   the plurality of cams being aligned in contact with each other so that closed space is formed by circumferential surfaces of adjacent cams, an outer circumferential surface of the inner race, and inner surfaces of the radially inner side plates,
   the inner race including an oil passage that continually supplies lubricant to the closed space when the clutch freewheels, and
   the outer race includes annular plate-like radially outer side plates that cover a radially outer portion of end faces of each of the plurality of cams,
   the plurality of cams each being configured to turn to cause a radially inner engagement surface of each cam to separate from an outer circumferential engagement surface of the inner race by viscosity of the lubricant when either the inner race or the outer race rotates in a direction in which the cams disengage.

\* \* \* \* \*